United States Patent
Goo et al.

(10) Patent No.: US 9,292,521 B1
(45) Date of Patent: Mar. 22, 2016

(54) ARCHIVING AND QUERYING DATA UPDATES ASSOCIATED WITH AN ELECTRONIC CATALOG SYSTEM

(75) Inventors: Almann T. Goo, Bellevue, WA (US); Erik W. Selberg, Seattle, WA (US); Chris A. Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 13/278,017

(22) Filed: Oct. 20, 2011

(51) Int. Cl.
*G06F 7/00* (2006.01)
*G06F 17/30* (2006.01)

(52) U.S. Cl.
CPC .... *G06F 17/30073* (2013.01); *G06F 17/30221* (2013.01)

(58) Field of Classification Search
CPC .................. G06F 17/30073; G06F 17/30221
USPC .......................................................... 707/667
See application file for complete search history.

(56) References Cited

U.S. PATENT DOCUMENTS

| | | | |
|---|---|---|---|
| 6,728,852 B1 * | 4/2004 | Stoutamire ................ 711/170 |
| 6,813,777 B1 * | 11/2004 | Weinberger et al. ........... 725/76 |
| 7,200,603 B1 * | 4/2007 | Hitz et al. | |
| 7,249,356 B1 * | 7/2007 | Wilson et al. ............... 718/101 |
| 7,257,689 B1 * | 8/2007 | Baird ........................... 711/162 |
| 7,257,690 B1 * | 8/2007 | Baird ........................... 711/162 |
| 7,555,503 B1 | 6/2009 | Neal et al. | |
| 7,698,258 B2 | 4/2010 | Hoffman et al. | |
| 7,752,195 B1 | 7/2010 | Hohwald et al. | |
| 7,752,286 B2 * | 7/2010 | Anderson et al. ............. 709/219 |
| 8,364,648 B1 * | 1/2013 | Sim-Tang ..................... 707/674 |
| 8,442,950 B2 * | 5/2013 | D'Souza et al. ............... 707/665 |
| 2001/0042131 A1 * | 11/2001 | Mathon et al. ................ 709/238 |
| 2003/0191737 A1 | 10/2003 | Steele et al. | |
| 2005/0193029 A1 * | 9/2005 | Rom et al. .................... 707/200 |
| 2006/0026194 A1 | 2/2006 | Bhushan et al. | |
| 2006/0053304 A1 * | 3/2006 | Fries et al. .................... 713/189 |
| 2007/0022149 A1 * | 1/2007 | Bacon et al. .................. 707/206 |
| 2007/0061266 A1 * | 3/2007 | Moore et al. .................... 705/51 |
| 2007/0288490 A1 * | 12/2007 | Longshaw ..................... 707/100 |
| 2008/0072290 A1 * | 3/2008 | Metzer et al. ...................... 726/3 |
| 2008/0263007 A1 | 10/2008 | Schmidt | |
| 2009/0006447 A1 | 1/2009 | Balmin et al. | |
| 2009/0037514 A1 | 2/2009 | Lankford et al. | |
| 2010/0114837 A1 * | 5/2010 | Prahlad et al. ................ 707/667 |
| 2010/0217750 A1 * | 8/2010 | Tokoro et al. ................. 707/640 |
| 2010/0257151 A1 | 10/2010 | Lohman et al. | |
| 2010/0333116 A1 * | 12/2010 | Prahlad et al. ................ 719/328 |
| 2011/0083088 A1 * | 4/2011 | Cisler et al. .................... 715/763 |
| 2012/0047212 A1 * | 2/2012 | Adams et al. .................. 709/206 |

* cited by examiner

*Primary Examiner* — Mark E Hershley
(74) *Attorney, Agent, or Firm* — Knobbe, Martens, Olson & Bear, LLP

(57) ABSTRACT

Systems and methods are provided for archiving and querying data updates received or generated by an update processing system associated with an electronic catalog. In some embodiments, item data updates associated with items represented in an electronic catalog are formed into new objects consisting of collections of records of item data updates. The new objects may have keys and versions associated with each record within them. The use of these objects allows item data updates, which are generally on the order of a few kilobytes, to be efficiently stored in archive storage systems, and to be queried without affecting the performance of the system that hosts the electronic catalog.

19 Claims, 4 Drawing Sheets

ARCHIVING AND QUERYING DATA UPDATES ASSOCIATED WITH AN ELECTRONIC CATALOG SYSTEM

BACKGROUND

Electronic catalog systems, such as those associated with large e-commerce sites, often store large quantities of catalog data to which updates are frequently made. The updates may be received by an update processing system from various sources of catalog data. The quantity of updates received over an extended period of time, such as several months or years, may be too large to enable the updates to be conveniently managed in a single database. While much of this data will likely never need to be accessed again, the data may still need to be preserved. Therefore, a portion of the data may be deleted from the database and moved to archive storage systems. Archive storage systems may also be used to store updates to the electronic catalog systems.

Archive storage systems work well for storing hundreds or thousands of objects that are on the order of multiple megabytes. However, such storage systems often do not work as well for storing hundreds of millions to billions of very small records (e.g., kilobytes in size). Additionally, when querying archived data, retrieving the desired archived data is often a challenge that requires a separate search of the archive media. Therefore, it may be difficult to obtain a combination of the archived and non-archived data in response to a single request.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
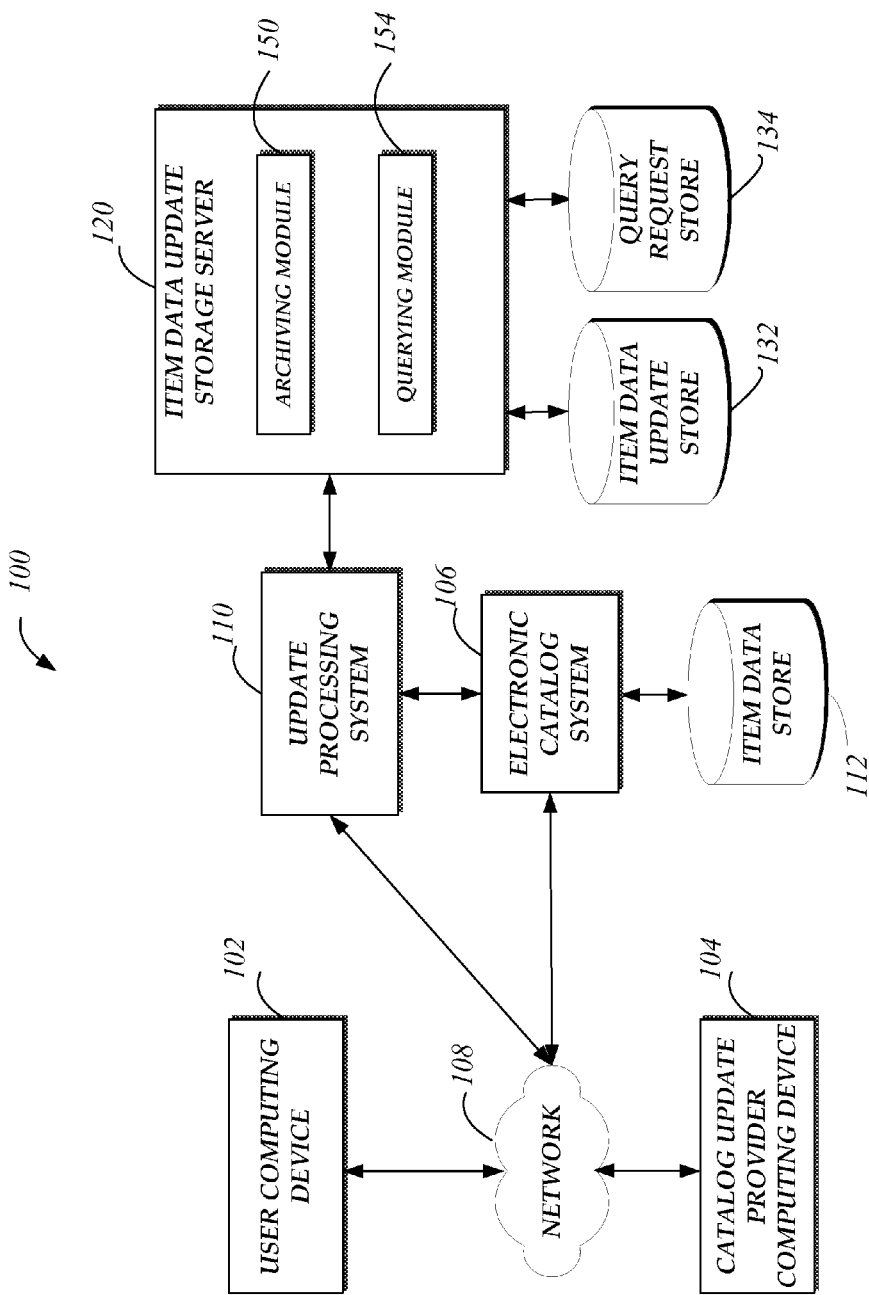
FIG. 1 is a block diagram depicting an illustrative operating environment including an item data update storage server for archiving and querying data updates to an electronic catalog system.

An electronic catalog system may host an electronic catalog listing a variety of items. The electronic catalog may also provide functionality for users to acquire catalog items from various catalog item providers. For example, the electronic catalog system may be part of an electronic commerce ("e-commerce") site that hosts an electronic catalog of many millions of items offered for sale or otherwise made available by numerous retailers, sellers, vendors, merchants, etc. (collectively and interchangeably referred to herein as "merchants"). One example of such an e-commerce site is described in U.S. Pat. No. 7,600,682, titled "Marketplace System in Which Users Generate Preorder Listings Via a Definitive Product Catalog," issued on Oct. 13, 2009. Other examples of electronic catalog systems include product review sites, video/movie rental sites, and video sharing sites.

Data regarding the items available in the electronic catalog may be updated by the various catalog item providers, such as the merchants in an e-commerce site, for example. The updates to the items, or item data updates, may consist of updates to one or more attributes of an item available in the electronic catalog. The item data updates may be uploaded to the electronic catalog system by one or more of the catalog item providers, who may also be referred to as catalog update providers.

In many circumstances, a provider or administrator of the electronic catalog system, or possibly a provider of catalog data updates, may need to analyze the historical updates associated with a particular catalog item or group of catalog items. For example, an administrator may wish to review the historical updates associated with a particular item to pinpoint the source of erroneous catalog data. As another example, a merchant, analyst, or other entity may wish to analyze the price histories of particular items. Ideally, the system that supports such historical analyses should be capable of executing queries of historical update data without adversely impacting the performance of either the electronic catalog system or the system that processes new updates from catalog item providers.

Generally described, aspects of the present disclosure relate to a system in which in the item data updates in the electronic catalog system are organized into objects containing collections of records having a predetermined size. The collections of records, or objects, may each comprise several small records of item data updates collected (and optionally compressed) into an object generally configured to be of a predefined size on the order of 16 MB to 64 MB. The created objects may also have keys and versions associated with each record within them. The keys and versions of the records may be used to periodically delete older versions of records for more efficient use of archival storage space. The use of these objects, including the keys and versions of the records within them, allows updates to the item data, which are each generally on the order of a few kilobytes, to be efficiently stored in archive storage systems. The system may, in some embodiments, be used to efficiently archive and query large quantities of catalog update data reflective of updates made to items available through the electronic catalog. The archive storage systems, including the objects created, may be queried without affecting access to the electronic catalog by the catalog update providers wishing to update item data, or by users wishing to browse or acquire items from the electronic catalog.

For example, the archive storage system may be used by an administrator or provider of the electronic catalog system or the update processing system to run queries for item data updates pertaining to a particular item in the catalog. In the example of an e-commerce site, the query may be directed to determining the price history of the item. This price history may in turn be used to locate the exact price of an item at a given point in time, or alternatively, to determine the origin of a possible error in data entry of the said item price. Querying the archive storage system may also be useful to efficiently find a bad record among the several million or billion records of item data in the electronic catalog. For example, the administrator of an e-commerce site may use the archive storage system to identify the source of erroneous catalog data, such as price data, pertaining to a particular catalog item. Because such queries are executed off-line (using computing resources separate from those that host the electronic catalog system), the execution of such queries does not impact performance as seen by end users of the electronic catalog system.

The electronic catalog system may be connected to a database of information about products that may be listed by catalog update providers. This database of information typically includes product IDs, and descriptions and product images provided by the catalog update providers. The product information in this database may be viewable by users through a browsable electronic catalog. The various pages of the electronic catalog may be in the form of web pages, display screens of an electronic services network or interactive television system, pages that are specially configured for display on smartphones, tablets or other mobile devices, or any other type of suitable electronic display available to users.

In the example of an e-commerce site, the availability of a product or the number of units available of a specific product may change over time due to the sale or disposal of the product through the electronic catalog system. Also, merchants may add to or change a listing of a particular product within the e-commerce site. An update processing system connected to the electronic catalog system (or e-commerce site) may be used to facilitate the updates to the products, as well as the processing of input provided by the merchants. The items available through the electronic catalog may have item data associated with them, where the item data may include one or more of price, availability, title, item identifier, item feedback (e.g., user reviews, ratings, etc.), item image, item description, and various other item attributes. The item data associated with an item may range from a few kilobytes to a few megabytes in size. The item data may be updated at various points in time, and the updates may come from various sources of item data (manufactures, sellers, retailers, other components of the electronic catalog system, etc.). Ideally, the electronic catalog system should be able to provide up-to-date catalog data to end users, without degradation in the performance (e.g., latency) experienced by the users, even when the update processing system is receiving update messages at a very high rate.

FIG. 1 is a block diagram depicting an illustrative operating environment 100 for archiving and querying data updates to an electronic catalog system. The electronic catalog system 106 may, in some embodiments, be part of an e-commerce site that provides functionality for users to interactively browse and make purchases from the electronic catalog. Users may remotely access and browse the electronic catalog using various types of user computing devices 102 (one shown). Merchants and/or other catalog update providers may submit catalog data updates from their respective computing devices 104 (one shown). A catalog update provider may, for example, be a merchant that sells items through the electronic catalog system, or may be a manufacturer or distributor of such items. The computing devices 102 and 104 may be any of a number of types of computing devices that are capable of communicating over a network including, but not limited to, a laptop, personal computer, tablet computer, personal digital assistant (PDA), hybrid PDA/mobile phone, mobile phone, smartphone, electronic book reader, digital media player, and the like.

In the environment shown in FIG. 1, the computing devices 102 and 104 may communicate with the electronic catalog system 106 via a communication network 108, such as the Internet or other communications link. Those skilled in the art will appreciate that the network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The electronic catalog system 106 may be connected to or in communication with an item data store 112 that stores information associated with items represented in electronic catalog. The item data stored for a particular item may, for example, include price, availability, title, item identifier, item feedback (e.g., user reviews, ratings, etc.), item image, item description, item category, and various item attributes. While the item data store 112 is depicted in FIG. 1 as being local to electronic catalog system 106, those skilled in the art will appreciate that the item data store 112 may be remote to the electronic catalog system 106, and/or may be a network-based service itself.

The electronic catalog system 106 may be connected to or in communication with an update processing system 110 that may include various components to process submissions and requests submitted by catalog update providers. Catalog update provider computing devices 104 may connect to, or communicate directly with the update processing system 110 through a network 108, or indirectly by going through the electronic catalog system 106. For example, in the case of an e-commerce system, merchants may initially select a particular product to be made available for acquisition in the electronic catalog. The merchants may also specify other information related to the product, such as the product's condition (new or used), the product price, a textual description of the product, a product image, and the like. In some embodiments, the merchant may be a volume seller wishing to bulk upload inventory data pertaining to several items at once. The update processing system 110 may be used to accept such bulk uploading of data, without requiring the merchant to access the electronic catalog system 106. In various circumstances, the merchants may also submit changes to a product's information, such as a change to the product's availability, the price, the description, the image, and the like, and these changes are processed by the update processing system in order to update the information associated with a product on the electronic catalog. For purposes of this disclosure, any of these changes, any other changes provided by other types of catalog item providers may be considered to be item data updates.

The update processing system 110 may also be used to facilitate item data updates created by the sale or return of a product for example. In some embodiments, the update processing system 110 may update the quantity of units available for acquisition of a product based on the sale or the return of a unit of the product on the electronic catalog system 106. While the update processing system 110 is depicted in FIG. 1 as being local to electronic catalog system 106, those skilled in the art will appreciate that the update processing system 110 may be remote to the electronic catalog system 106, and/or may be a network-based service itself.

The illustrative operating environment also includes an item data update storage server 120 connected or in communication with the update processing system 110, for archiving and querying data updates to the electronic catalog processed by the update processing system 110. The item data update storage server 120 may include an archiving module 150 for collecting item data updates received from the update processing system 110 and processing them for efficient archiving, and a querying module 154 for querying the archived item data updates.

The item data update storage server 120 may be connected to or in communication with an item data update store 132 that stores information associated with item data updates, such as a change in the item's price, availability, title, item identifier, item feedback (e.g., user reviews, ratings, etc.), item image, item description, item attributes, etc. The item data update storage server 120 may also be connected to or in communication with a query request store 134 that stores information associated with queries of the archived item data updates, such as a list of query requests received from the update processing system 110, status of pending queries, etc. While the item data update store 132 and the query request store 134 are depicted in FIG. 1 as being local to item data update storage server 120, those skilled in the art will appreciate that one or more of these data stores may be remote to the item data update storage server 120, may be local to the update processing system 110, and/or may be network-based services themselves.

The system 100 is depicted in FIG. 1 as operating in a distributed computing environment comprising several computer systems that are interconnected using one or more computer networks. However, it will be appreciated by those skilled in the art that the system 100 could equally operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and/or peer to peer network configurations to implement at least a portion of the processes.

In brief, the electronic catalog system 106 is generally responsible for providing an electronic catalog through a user interface in communication with various user devices, such as user computing device 102, via network 108. The electronic catalog provided by the electronic catalog system 106 may include generating text and/or graphics, possibly organized as a user interface using hypertext transfer or other protocols in response to information requests received from the various user devices. The electronic catalog system 106 is also in communication with other user devices, such as catalog update provider computing device 104, via network 108. The providers of items available in the electronic catalog may provide updates to such items through the electronic catalog system 106 and/or the update processing system 110.

The items available for acquisition (and/or browsing, rental, download, streaming, etc.) through the electronic catalog system 106 may, for example, include physical products that are shipped to users, digital products that are downloaded or streamed to user computing devices, subscriptions, product reviews, and/or various other types of items. Users can obtain information on available goods and services (referred to herein as "items") from item data store 112, as is done in conventional electronic commerce systems. In one embodiment, the item data store 112 includes information on items available from a plurality of sellers (as opposed to storing information for only a single vendor). In certain embodiments, the electronic catalog system 106 may also access item data from other data sources, either internal or external to system 100. Accordingly, the electronic catalog system 106 may obtain item information for items offered for sale by one or more sellers. A user may then acquire items from one or more sellers in a single transaction or order placed with the electronic catalog system 106. In other embodiments, the user may purchase items from a single vendor in a single transaction or order placed with the electronic catalog system 106. The electronic catalog system 106 may also be connected to or in communications with a backend payment processing system (not shown) to handle tasks such as credit card processing and Automated Clearing House (ACH) transfers.

At various points in time, the items available through the electronic catalog system 106 may have updates associated with them. As described above, the updates may have been received from the catalog update providers, or may have been generated by the update processing system 110 based on the sale or return of the items on the electronic catalog system 106. In one embodiment, the item data storage server 120 periodically captures an image of the item data store 112 at a specific point in time, and combines the image with updates associated with the various item data, and creates a new image and archives it in the item data update store 132. The archiving to the item data update store 132 may be done by transforming the new images into several collections of records of data.

The records of data may each have a key representing a value associated with the item, and a version associated with the value of the item. For example, the record of data associated with an item at a first point in time may have a first key and a first version associated with it. At a second point in time, that same item may have the same key associated with it, but with a second version. In some embodiments, the second version may be higher than the first version. Similarly, a different item would have a different key associated with it, with similar first and second versions at different points in time. In some embodiments, the archiving module 150 of the item data update storage server 120 may periodically purge records having version values which are lower than another record having an identical key with a higher version value, in order to provide more archival space in the item data update store 132.

The collections of records of data may be grouped together based on time, size, or some other criteria. Records may for example be appended to one another until the collection reaches a predetermined size, such as for example about a hundred to several hundred megabytes (MB). In other embodiments, the records may be grouped together until a predetermined interval of time is reached. For example, records may be successively appended for fifteen minutes, one hour, one day, or any other predetermined interval of time deemed appropriate for relevance of the update to the querying system. After the predetermined size or interval of time is reached, the collection of records may optionally be compressed to a size of about 16 MB to about 64 MB. The size of a compressed object may be configurable.

For example, if the item data updates are not consistently received over time, the collections of records may be constrained in time; if the item data updates are relatively large in number and frequency, the collections of records may be based on overall size of the collection. The determination of the size of each object may be based on an optimization and tradeoff between efficiency of storage and throughput to users of the electronic catalog system. For example, the performance of the electronic catalog system as seen by end users should not be affected by the archiving of item data updates by the item data update storage server 120 or by the querying of the archived updates.

The objects may also have metadata associated with them, which allows an indexing of the records within an object in order to process only the relevant records within the objects, as opposed to processing the entire collection of records. Generally, metadata may include any data used to describe aspects or properties of a given object. For example, metadata may include information identifying the date of an object's creation, the identity of its creator, whether the object has any records associated with it, or other suitable information. In some embodiments, metadata may include information indicative of usage characteristics of an object, such as the total size of records associated with an object, access history of users with respect to an object and/or its associated records, or any other suitable information related to current or historical usage of an object. In one embodiment, each object may be associated with a respective unique identifier, which may be automatically assigned by the item data update storage server 120. Additionally, a pointer to each record within the object may be stored within the metadata or as a separate property or field of an object. In some other embodiments, a given object may not include explicit references or pointers or other information corresponding to the records associated with a given object.

By using the identifiers or pointers, it is possible to only decompress a specific record within the collections. After archiving, the item data storage server 120 may make the objects available for query by catalog update providers, or administrators of the update processing system 110. In some embodiments, the item data storage server 120 may enable the querying by publishing the unique identifiers associated with the objects.

Figure 2:
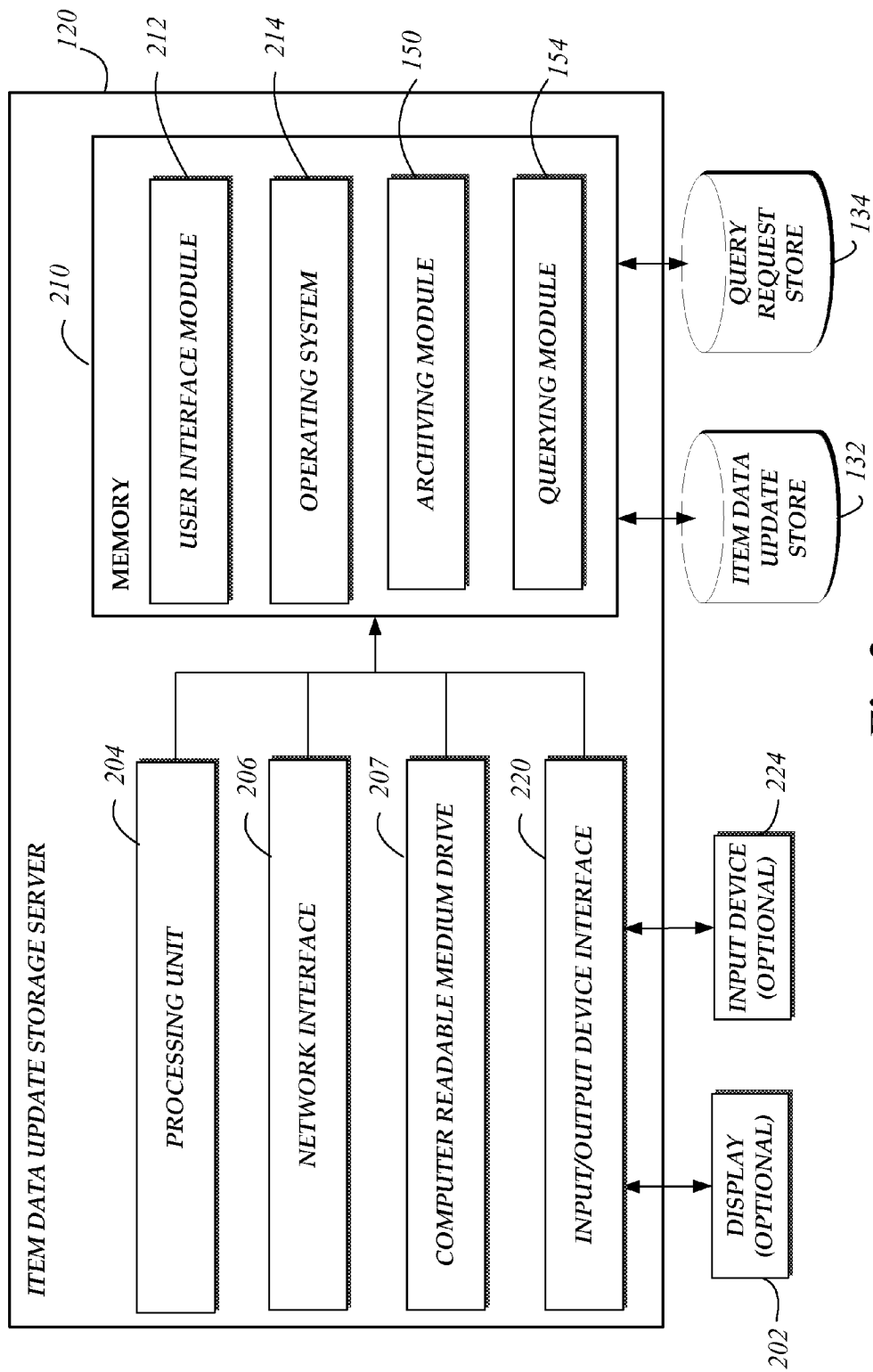
FIG. 2 depicts a general architecture of an item data update storage server for archiving and querying data updates to an electronic catalog system.

The item data update storage server 120 may include a processing unit 204, a memory unit 210, an optional display 202, an input/output device interface 220, an optional input device 224, a computer readable medium drive 207 and a network interface 206, all of which may communicate with one another by way of a communication bus, as illustrated in FIG. 2. A network interface included in the item data update storage server 120 is preferably connected to one or more computer networks that connect to other components in the system 100. A processing unit may thus receive information and instructions from other computing components, such as the update processing system 110 and item data store 112, via the network interface.

FIG. 2 depicts a general architecture of one embodiment of the item data update storage server 120. The item data update storage server 120 depicted in FIG. 2 includes an arrangement of computer hardware and software components that may be used to implement aspects of the present disclosure. Those skilled in the art will appreciate that the item data update storage server 120 may include many more (or fewer) components than those shown in FIG. 2. It is not necessary, however, that all of these generally conventional components be shown in order to provide an enabling disclosure. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from an optional input device 224, such as a keyboard, mouse, digital pen, touchscreen, etc.

The memory 210 contains computer program instructions that the processing unit 204 executes in order to implement one or more embodiments. The memory 210 generally includes RAM, ROM and/or other persistent, non-transitory computer-readable media. The memory 210 may store an operating system 214 that provides computer program instructions for use by the processing unit 204 in the general administration and operation of the item data update storage server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. This user interface may be used to directly access the item data update storage server 120 without going through the electronic catalog system 106, for example. In addition, memory 210 may include or communicate with one or more auxiliary data stores, such as item update data store 132 and query request 134 discussed above. In addition to the user interface module 212 and operating system 214, the memory 210 may include an archiving module 150 and a querying module 154, discussed above in reference to FIG. 1, which may be executed by the processing unit 204.

Figure 3:
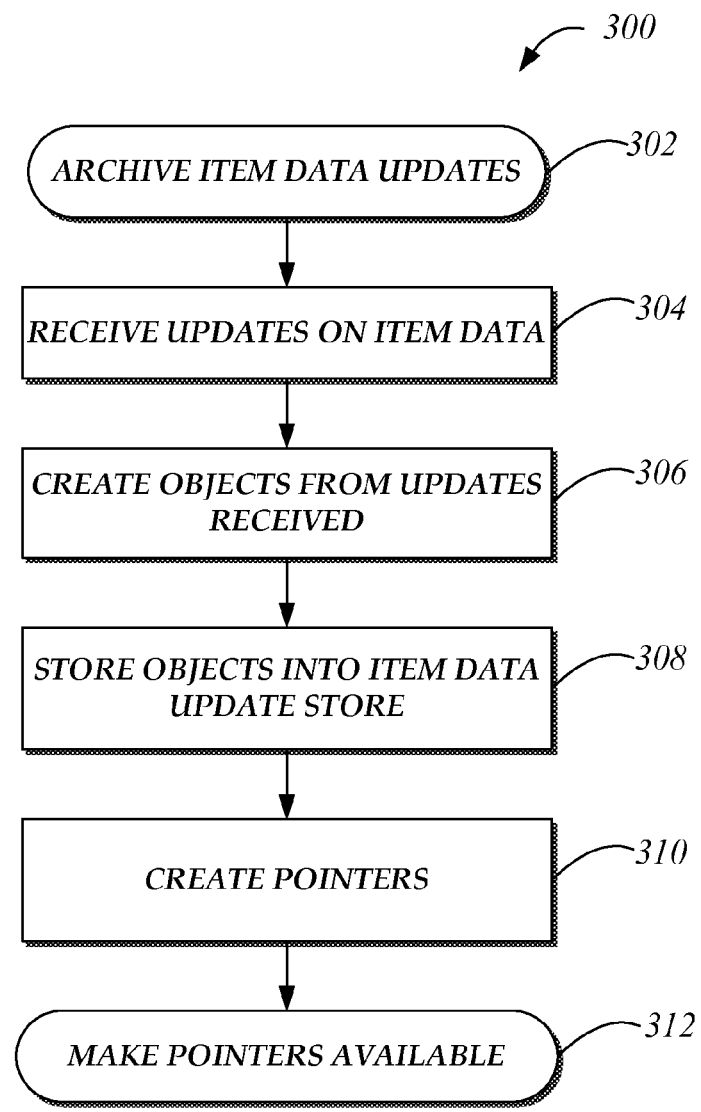
FIG. 3 is a flow diagram of an illustrative routine implemented by the item data update storage server for archiving data updates to an electronic catalog system.

FIG. 3 is a flow diagram of an illustrative routine 300 implemented by the item data update storage server 120 (such as by the archiving module 150) for archiving data updates received or generated by the update processing system 110. In some embodiments, the illustrative routine 300 may be implemented on a set schedule, such as hourly, daily, weekly, etc., to efficiently archive item data updates received from or generated by the update processing system 110. In other embodiments, the illustrative routine 300 may be implemented to occur substantially in real time as item update messages are received from or generated by the update processing system 110. In some embodiments, aspects such as block 304 of illustrative routine 300 may be implemented substantially in real-time, while other aspects such as blocks 306 through 312 are implemented on a set schedule, such as at the end of a day. For example, the item data update storage server 120 may take an initial snapshot of the item data store each morning including item data updates performed the previous night, and may take additional snapshots, for example, in response to a triggering event, such as an item data update during the day.

The routine 300 is described in terms of a system in which item data updates are stored in one or more data stores, such as item data update store 132. As discussed above, a new image, including a real-time image of the item data store 112 combined with updates associated with the various item data, is archived in the item data update store 132. In certain embodiments, as discussed above, the item data store 112 stores information associated with items available for browse and/or purchase. Item data stored in item data store 112 may include any information related to an item, such as an item available for acquisition, which may be of interest to a user or may be useful for classifying or recommending an item. The information updates may reflect data submissions by catalog update providers, and/or other types of updates generated by the update processing system 110 based on actions performed by users during browsing of the electronic catalog, such as sales or returns of certain items.

The illustrative routine 300 begins at block 302, then proceeds to block 304, where the item data update storage server 120 receives updates on item data of one or more items. In various embodiments, the updates may be received from or generated by the update processing system 110, or may also be received from a data store, such as query request store 134. The received, generated or retrieved update may include, for example, a change in one or more item's price, availability (including a new item being added), title, item identifier, item feedback (e.g., user reviews, ratings, etc.), item image, item description, item attributes, etc.

Once the item data update storage server 120 has received the update information, the routine 300 proceeds to block 306, where the item data update storage server 120 creates collections of records including the updates received. The updates may be combined with a previously saved image of the item data store 112, or an image of the item data store 112 may be saved once an update is received. A new image, which is the combination of the old image and the received updates, is then organized into a new object. In various embodiments, the objects may include a collection of records appended to one another based on various configurable criteria. The records may be appended to each other according to the type of item associated with the update, the price of the item associated with the update, the size of the collection of records, the time elapsed since the last update, etc. The collections of records may also further be compressed, and/or encrypted. As described above, each object may have associated with it a key for each record, as well as a version associated with each record. The keys and versions associated with the records enable more efficient use of archival storage space, and also help with querying of the records.

Once the item data update storage server 120 has created the collections of records, the routine 300 proceeds to block 308. At block 308, the item data update storage server 120 stores the collections of records into the item data update store 132. The records each have a key and a version associated with them. In some embodiments, the item data update storage server 120 may periodically scan through all records in given objects and across objects, and perform a de-duplication and purging operation. If there are several instances of the same record in more than one object, the item data update storage server 120 may remove all instances except for one, in order to optimize storage. Similarly, if there are older versions of the same record within an object, or within different objects, the server 120 may delete all instances except for the record with the most recent, or highest version. In some embodiments, the most recent version may have the lowest version number associated with it. In some embodiments, all versions of records may be kept.

At block 310, the item data update storage server 120 creates a pointer to the records stored in each of the objects. The pointers allow access to specific records within a collection. A specific record may need to be retrieved in response to a query request, for example. The pointers allow identification of the location of the records within an object in the item data update store 132. The pointers also allow the retrieval of only specific records and/or specific versions of records within the saved objects, thereby reducing bandwidth requirements during queries.

For example, a query may require the retrieval of the historical price of a catalog item, such as a particular book ("Book A), as indicated to users at exactly 5:30 PM on Jan. 1, 2011. The record corresponding to the item data associated with the Book A, including the price of the book, at that specific point in time would be stored in an object in the item data update store 132. The object may also include other records of item data collected around 5:30 PM on Jan. 1, 2011. The other item data collected in the same object may pertain to Book A at various points in time around 5:30 PM, according to a predetermined time interval, and/or other items in the electronic catalog with item data updates occurring around that interval of time, depending on how the records were appended to one another at the time of archiving. Additionally, the updates to the price associated with Book A at other points in time, for example on other days, would be stored in other objects. When the query is received, the specific object associated with the query is located. The pointers within the object are then used to only retrieve the record associated with Book A at exactly 5:30 PM on Jan. 1, 2011. Therefore, through the use of pointers, there is no need to return the whole collection of records within an object. Also, through the use of objects, there is also no need to return all records associated with price updates to Book A.

Once the pointers are created, the item data update storage server 120 makes the pointers available at block 312. Making the pointers available may include sending the pointers to the update processing system 110 and/or the electronic catalog system 106, or to other systems, including other transaction processing systems. The pointers may also be made available to the querying module 154 within the item data update storage server 120.

Figure 4:
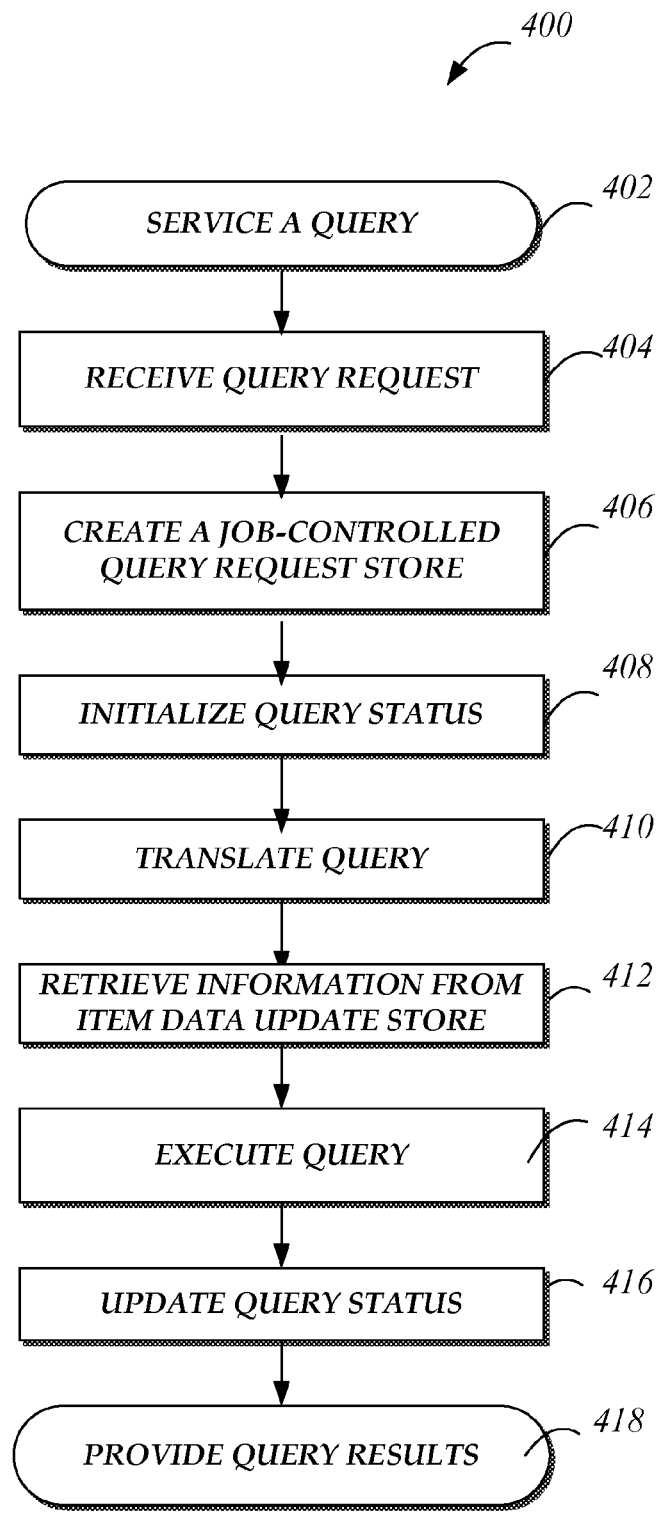
FIG. 4 is a flow diagram of an illustrative routine implemented by the item data update storage server for querying data updates to an electronic catalog system.

FIG. 4 is a flow diagram of an illustrative routine 400 implemented by the item data update storage server (such as by the querying module 154) for querying data updates in an electronic catalog system 106. An entity or entities operating the update processing system 110 and/or the electronic catalog system 106 may want to investigate the accuracy of entry of item data updates at specific points in time. The accuracy of data entry may be useful to isolate the origin of bad records within the archived records, which could be related to customer service issues with users and/or catalog update providers using the electronic catalog system. The same or other entities may also want to examine the historical progression of one or more attributes of an item available through the electronic catalog. For example, some entities may want to analyze the price of an item in relation to that item's marketing campaigns. The historical records may also need to be examined for determining the date of occurrence of a mistake in one of the attributes associated with an item. In order to achieve these and other objectives, the item data update storage server may be queried.

The systems and methods of archiving as described above, in conjunction with the querying methods and systems described below enable the efficient and nondisruptive querying of a vast quantity of historical items. In the example of an electronic commerce site, the amount of historical items may be in the order of several billions. By leveraging the item data update store, which is independent of the item data store, the querying may be performed without affecting the performance seen by the users and catalog update providers. In addition, by leveraging the pointers in the collections of records stored on the item data update store, the bandwidth requirements of the query results are minimized, as described above.

The routine 400 is described in terms of a system in which item data updates are stored in one or more data stores, such as item data update store 132, and information associated with the query requests is stored in one or more data stores, such as query request store 134. The illustrative routine 400 begins at block 402, then proceeds to block 404, where the item data update storage server 120 receives a query request. In various embodiments, the query request may be received from the update processing system 110, from computing device 104, or from another computing device not illustrated. The received query request may include, for example, a query regarding the historical attributes of an item available on the electronic catalog.

Once a query request is received, the item data update storage server 120 may manage the query by creating a job-controlled query request store, such as query request store 134 at block 406. The query request store 134 may be a relational database, such as for example an SDB database. The query request store 134 provides persistence in the item data updates for managing queries and other metadata associated with the collections of records stored on the item data update store 132. In some embodiments, the metadata associated with the records may be updated to reflect the query request received.

The item data update storage server 120 also initiates a query status at block 408 by initiating a cluster to operate a query in parallel with the archiving activities of the item data update storage server 120. The cluster then serves as the processor of the query. This enables the query to be executed without affecting the performance of the electronic catalog system 106, and also without affecting the processing of new item data updates by the update processing system 110.

After the cluster is initiated, the item data update storage server 120 translates the received query request, at block 410. In various embodiments, an entity using the update processing system 110, or a computing device 104, may use a user interface to input a query. The item data update storage server 120 may receive this query, and translate it into the necessary format to interact with the item data update store 132. In some embodiments, the query received may be designed for querying hierarchical structures, and may be translated into a distributed table scan format which is compatible with the item data update store 132.

Once the query received is translated to the format appropriate to the item data update store 132, information is retrieved from the item data update store 132 at block 412. The information retrieval may leverage the pointers to the objects, and thereby be performed in a reduced time. Instead of scanning through all archived records, the pointers to the objects enable quick resolution of locations of specific objects and records. The information retrieved is written into the item data update store 132, as a new image of the item data store 112, including the result of the received query request. When a new query is subsequently received, the information in the item data update store 132 reflects the results generated from the previous query, along with the versions associated with the different items and updates stored in the collections of records. The information retrieved from the item data update store may comprise several objects, each containing a collection of several records.

Once the information is retrieved from the item data update store, the query is executed at block 414. The query execution may include applying a filter to the retrieved information, in order to return only relevant records. The query execution may in some cases also include de-duplication of data from the objects retrieved. For example, a query request may include a request of the price history of an item over a period of one month. The information retrieved may include the price history of all items on a particular day, and also price history of items on all days, including days where the price history of the given item was not changed. Therefore, the query execution might include filtering out the records associated with other items during that period. The query execution may also include removing records of the item on consecutive time periods where the price was not changed.

Once the query is executed, the query status is sent to the cluster in order to update the status of the query in the query request store 134 at block 416. The routine 400 ends at block 418, where the results of the user query are provided to the requesting entity. The results may be provided on a user interface on the update processing system 110, and/or on another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes, including but not limited calculation processes, described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for archiving updates associated with item data, said method executed on a computing environment, the method comprising:

under control of one or more configured computing devices, receiving, from an update processing system that processes updates submitted by catalog update providers, a plurality of update messages that specify updates to item data included in an electronic catalog, wherein the item data is accessed through an electronic catalog system that hosts the electronic catalog, and wherein the update messages comprise a change in at least one of a price, description, sale status, delivery status or viewed status of an individual item data;

creating an object from the plurality of update messages received, wherein the object includes a subset of the update messages associated with a common criterion;

compressing the object;

transmitting the object to an item data update store;

creating a first pointer to the object and a plurality of second pointers to individual update messages included in the object; and providing the first pointer and at least one second pointer to an entity to enable the entity to access and separately decompress at least one update message included in the object, wherein the at least one second pointer references the at least one update message within the object.

2. The method of claim 1, wherein creating an object from the plurality of update messages comprises appending successive update messages from the plurality of update messages received based on at least one predetermined criterion.

3. The method of claim 2, wherein the predetermined criterion is a time associated with the receipt of an update message.

4. The method of claim 2, wherein the predetermined criterion is an interval of time between the receipt of a first and a second update message.

5. The method of claim 2, wherein the predetermined criterion is a size associated with the created object.

6. The method of claim 1, wherein the object has a size of at least half the size of the object before compressing.

7. The method of claim 1, wherein creating the first pointer to the object comprises creating a locator value corresponding to a location of the object on the item data update store.

8. The method of claim 1, wherein the entity is an operator of the update processing system.

9. A computer system for archiving updates associated with item data, the computer system comprising:
  a message receiving module configured to receive, from an update processing system, a plurality of update messages associated with item data, wherein the item data is accessed through an electronic catalog system and wherein an update message associated with item data comprises a change in at least one of a price, description, sale status, delivery status or viewed status of an individual item data;
  a batch creation module configured to create a batched version of the plurality of update messages received and configured to compress the batched version, wherein the batch creation module comprises computer hardware and wherein the plurality of update messages are associated with a common criterion;
  a transmitting module configured to transmit the batched version to an item data update store;
  a pointer creation module configured to create a first pointer to the batched version and a plurality of second pointers to individual update messages included in the batched version; and
  a publishing module configured to provide an indication of the first pointer and at least one second pointer to an entity to enable the entity to access and separately decompress at least one update message included in the batched version, wherein the at least one second pointer references the at least one update message within the batched version.

10. The computer system of claim 9, wherein the batch creation module configured to create a batched version of the plurality of update messages is configured to append successive update messages from the plurality of update messages received based on at least one predetermined criterion.

11. The computer system of claim 10, wherein the predetermined criterion is at least one of the price, description, sale status, delivery status and viewed status of the item data.

12. The computer system of claim 9, wherein the entity is an entity not associated with the electronic catalog system.

13. A computer-implemented method for making item data updates available for query, said method executed on a computing environment, the method comprising:
  under control of one or more configured computing devices,
  generating a first image of an item data store;
  receiving a plurality of updates associated with item data from an update processing system, wherein the item data is accessed through an electronic catalog system and wherein an update associated with item data comprises a change in at least one of a price, description, sale status, delivery status or viewed status of an individual item data;
  generating a second image comprising the first image and the plurality of updates received;
  creating a batched version of a plurality of second images, wherein the plurality of second images are associated with a common criterion;
  compressing the batched version;
  transmitting the batched version to an item data update store; and
  creating a first pointer to the batched version and a plurality of second pointers to individual updates of the plurality of updates included in the batched version to enable querying and separate decompression of at least one update of the plurality of updates, wherein at least one second pointer references the at least one update within the batched version.

14. The method of claim 13, wherein creating a batched version of the plurality of second images comprises appending successive second images until the batched version reaches a predetermined size.

15. The method of claim 13, wherein the compressed batched version has a size of $\frac{1}{10}$th the size of the batched version before compressing.

16. A computer readable, non-transitory storage medium having computer executable modules for making item data updates available for querying, the computer executable modules comprising:
  an update receiving module configured to receive a plurality of updates associated with item data from an update processing system, wherein the item data is accessed through an electronic catalog system and wherein an update associated with item data comprises a change in at least one of a price, description, sale status, delivery status or viewed status of an individual item data;
  an image generating module configured to generate a first image of an item data store and a second image comprising the first image and the plurality of updates received;
  a batch creation module configured to create and compress a batched version of a plurality of second images, wherein the batch creation module comprises computer hardware and wherein the plurality of second images are associated with a common criterion;
  a transmitting module configured to transmit the batched version to an item data update store; and
  a pointer creation module configured to create a first pointer to the batched version and a plurality of second pointers to individual updates of the plurality of updates included in the batched version to enable querying and individual decompression of at least one update of the plurality of updates, wherein at least one second pointer references the at least one update within the batched version.

17. The computer-readable medium of claim 16, wherein the item data and the plurality of updates each comprise a version number.

18. The computer-readable medium of claim 17, wherein the batch creation module is further configured to compare the version associated with item data with the version associated with the update associated with the item data.

19. The computer-readable medium of claim 18, wherein the batch creation module is further configured to delete the item data or the update with the lower version.

\* \* \* \* \*